United States Patent
Lee

[19]

[11] Patent Number: 5,872,662
[45] Date of Patent: Feb. 16, 1999

[54] OPTICAL PICK-UP APPARATUS

[75] Inventor: Kwang-Suk Lee, Seoul, Rep. of Korea

[73] Assignee: Daewoo Electronics Co., Ltd., Seoul, Rep. of Korea

[21] Appl. No.: 865,985

[22] Filed: May 30, 1997

[30]  Foreign Application Priority Data

May 31, 1996 [KR]  Rep. of Korea ............... 1996 19101

[51] Int. Cl.⁶ ............................................. G02B 7/02
[52] U.S. Cl. ........................................ 359/824; 369/44.11
[58] Field of Search ........................... 359/819, 822–824; 369/44.11, 44.14–44.16

[56]  References Cited

U.S. PATENT DOCUMENTS 5,416,756  5/1995  Takeshita et al. ..................... 369/32

FOREIGN PATENT DOCUMENTS 0 470 807  2/1992  European Pat. Off. .

Primary Examiner—Georgia Epps
Assistant Examiner—Dawn-Marie Bey
Attorney, Agent, or Firm—Pillsbury Madison & Sutro LLP

[57]  ABSTRACT

An optical pick-up apparatus can be used for recording or reproducing information signals onto/from both a compact disc and a digital versatile disc. The optical pick-up apparatus has a base plate, a pair of guide bars fixed to the first bottom wall of the base plate, first and second permanent magnets fixedly coupled to both side walls of the base plate, first and second tracking coils slidably wound around the first and second permanent magnets, an object lens holder formed at upper and lower edges thereof with focusing coils, first and second object lenses mounted on the upper surface of the object lens holder, a movable member slidably assembled with the first and second guide bars, a pair of leaf springs for coupling the object lens holder to the movable member, a half mirror section for directing a half of the reflected laser beam towards the first object lens and transmitting a remaining half of the laser beam therethrough, and a total reflection section for directing the laser beam which passes through the half mirror section towards the second object lens. The radius curvature of the first object lens is different from the radius curvature of the second object lens. The optical pick-up apparatus has a simple construction and is easily manufactured at a reduced cost.

17 Claims, 6 Drawing Sheets

OPTICAL PICK-UP APPARATUS

BACKGROUND OF THE INVENTION

1. Field of the Invention

The present invention relates to an optical pick-up apparatus for a disc player, and more particularly to an optical pick-up apparatus which can be used for recording or reproducing information signals onto/from both a CD(compact disc) and a DVD(digital versatile disc).

2. Prior Arts

An optical pick-up is an apparatus for recording information on an optical disc or reading out the recorded information from the optical disc by using a laser beam. The optical pick-up is installed below the optical disc and linearly moves from a center of the optical disc to an outer periphery the optical disc so as to detect a desired track position on the optical disc. The optical pick-up radiates a beam towards a pit formed on a recording surface of the optical disc and detects a digital signal from a reflected beam through an optical system. The detected digital signal is converted to an analog signal by a D/A converter so that information recorded in the optical disc is reproduced.

Generally, the optical pick-up includes a light source for producing the laser beam, a beam splitter for directing the laser beam emitted from the light source toward an objective lens which focuses the laser beam on the surface of an optical disc, and a photo diode for receiving the laser beam reflected from the surface of the optical disc.

Information tracks, on which information is recorded, are concentrically or spirally formed on the recording surface of the optical disc, and the optical pick-up emits the laser beam onto the information tracks so as to record data on a predetermined position of the optical disc or to reproduce the data from the predetermined position.

In order to accurately record or reproduce the data, a focusing error control and a tracking error control should be carried out. In other words, the laser beam emitted onto the information track from the optical pick-up should trace the information track while the disc player is being operated. In addition, a distance between the recording surface of the optical disc and the object lens should be constantly maintained. Thus, a disc recording/reproducing apparatus detects a servo error signal including a focusing error signal and a tracking error signal by utilizing the beam reflected from the information track, and then applies electric signals to both a focusing circuit and a tracking circuit based upon the detected servo error signal, thereby moving the optical pick-up in the focusing and tracking directions.

FIG. 6 shows such a conventional optical pick-up 10. As shown in FIG. 6, conventional optical pick-up 10 includes a yoke plate 44, to which suspension support plates 46 are attached, and an objective lens holder 14 which is suspended above yoke plate 44 by means of suspensions 50 and supports an objective lens 12.

A laser beam through hole 45 is formed at the center of yoke plate 44 to allow the laser beam to pass therethrough, and a pair of inner yokes 38 and 40 and a pair of outer yokes 36 and 42 are arranged on yoke plate in opposition to each other. Inner yokes 38 and 40 are respectively surrounded by focusing coils 24 and 26. Permanent magnets 32 and 34 are respectively arranged between inner yoke 38 and outer yoke 36, and between inner yoke 40 and outer yoke 42. Also, tracking coils 28 and 30 are respectively arranged between focusing coil 24 and permanent magnet 32, and between focusing coil 26 and permanent magnet 34. Suspension support plates 46 are attached to one end of yoke plate 44, and an end plate 48 is attached to the rear surface of suspension support plates 46.

Suspensions 50 are manufactured by conductive materials, and receives an electric current from a current source (not shown) through end plate 48. One end of each suspension 50 is fixed to end plate 48 by passing through suspension support plates 46, and other end of each suspension 50 is fixed to support pieces 16 and 18 which are integrally formed with both sides of object lens holder 14.

Optical pick-up 10 constructed as described above operates as follows.

Firstly, when an optical disc, such as a CD, has been loaded in a cartridge of the disc player, optical pick-up 10 moves to a disc loading position by a driving device (not shown). Next, a laser beam emits toward a recording surface of the optical disc from a laser beam source (not shown) through object lens 12. Then, the laser beam is reflected from the recording surface and inputted into a photo detector (not shown).

Upon receiving the reflected laser beam, the photo detector detects a focusing error caused by vertical motion of the optical disc and a tracking error caused by a radial deviation of the optical disc and sends focusing and tracking error signals to a microcomputer (not shown). Then, in order to correct the focusing and tracking errors, the microcomputer sends an electric signal to both a focusing circuit and a tracking circuit so that an electric current is applied to both focusing coils 24 and 26 and tracking coils 28 and 30. When the electric current is applied to focusing coils 24 and 26, object lens holder 14 moves in a focusing direction F by an electromagnetic-interaction generated between permanent magnets 32 and 34 and focusing coils 24 and 26, thereby correcting the focusing error.

In addition, when the electric current is applied to tracking coils 28 and 30, object lens holder 14 moves in a tracking direction F by an electromagnetic-interaction between permanent magnets 32 and 34 and tracking coils 28 and 30, thereby correcting the tracking error.

However, though conventional pick-up apparatus 10 can record and reproduce information onto/from an optical disc having a recording density similar to that of a conventional CD, it cannot be used for recording and reproducing information onto/from an optical disc having a higher recording density than that of the CD, such as a DVD.

In order to overcome the above problem, various types of optical pick-up apparatuses which can be used for recording and reproducing information onto/from both a CD and a DVD have been proposed.

For example, European Patent No. 0 470 807 A1 issued to Miyagawa discloses an optical disc apparatus which can record, reproduce, or erase information signals onto/from a plurality of optical discs. Miyagawa's apparatus comprises a cartridge having a discrimination hole formed on a surface thereof. When the cartridge has been loaded into the optical disc apparatus, a light emit diode (LED) emits a light towards the discrimination hole, and a photo diode detects the transmission light which passes through the discrimination hole. Then, the photo diode sends the detected signal to a controller and the controller determines the sort of an optical disc enclosed in the cartridge based on the detected signal. When the sort of the optical disc is determined, the controller sends a control signal to a plurality of selectors so as to selectively operate a first converging optical system or a second converging optical system according to the sort of the optical disc.

However, in order to selectively record or reproduce information onto/from the optical disc, Miyagawa's apparatus requires first and second converging optical systems which comprise a light source, a collimating lens, a beam splitter, a mirror, an object lens, a detect lens, and a photo detector, respectively. Accordingly, Miyagawa's apparatus not only increases the number of elements, but also many steps for assembling the optical disc apparatus are required. For this reason, Miyagawa's apparatus increases the manufacturing cost and the size of the disc player.

SUMMARY OF THE INVENTION

The present invention has been made to overcome the above described problem of the prior art, and accordingly it is an object of the present invention to provide an optical pick-up apparatus which has a simple construction and is capable of recording and reproducing information onto/from both a CD and a DVD.

To achieve the above-described object, the present invention provides an optical pick-up apparatus comprises:

- a base plate having a first side wall, a second side wall and a first bottom wall;
- first and second guide bars fixed to the first bottom wall of the base plate;
- a pair of first permanent magnets fixedly coupled to both sides of the first side wall of the base plate;
- a pair of second permanent magnets fixedly coupled to both sides of the second side wall of the base plate;
- a first tracking coil slidably wound around the pair of first permanent magnets, the first tracking coil and the pair of first permanent magnets generating a first electromagnetic interaction therebetween;
- a second tracking coil slidably wound around the pair of second permanent magnets, the second tracking coil and the pair of second permanent magnets generating a second electromagnetic interaction therebetween;
- an object lens holder formed at upper and lower edges thereof with focusing coils, the object lens holder having a holographic element for radiating a laser beam at a first upper portion thereof, the focusing coils and the first and second permanent magnets generating a third electromagnetic interaction therebetween;
- first and second object lenses for converging the laser beam onto a recording surface of a disc, the first object lens being disposed at a second upper portion of the object lens holder, the second object lens being disposed at a third upper portion of the object lens holder, the first object lens having a first radius curvature, the second object lens having a second radius curvature different from the first radius curvature;
- a movable member slidably assembled with the first and second guide bars, the movable member being coupled to both first and second tracking coils;
- a first means for coupling the object lens holder to the movable member, the object lens holder being moved up and down by the first means;
- a second means for fully reflecting the laser beam radiated from the holographic element;
- a third means for receiving the laser beam reflected by the first means, the first means directing a half of the reflected laser beam towards the first object lens and transmitting a remaining half of the laser beam therethrough; and
- a fourth means for directing the laser beam which passes through the third means towards the second object lens.

According to a preferred embodiment of the present invention, the first means includes first and second leaf springs. The first leaf spring has a first end secured to an upper portion of the object lens holder and a second end secured to an upper portion of the movable member. The second leaf spring has a third end secured to a lower portion of the object lens holder and a fourth end secured to a lower portion of the movable member.

The second means includes a first slanted plate slanted at an angle of 45 degrees with respect to the holographic element, a first total reflection mirror having a first size identical to the first slanted plate and being attached to an upper surface of the first slanted plate, and first protectors attached to both sides of the first slanted plate for preventing the first total reflection mirror from separating from the first slanted plate.

The third means includes a second slanted plate slanted towards the first slanted plate at a second predetermined angle and formed at a center thereof with a beam perforating hole, a half mirror having a second size identical to the second slanted plate and being attached to an upper surface of the second slanted plate, and second protectors attached to both sides of the second slanted plate for preventing the half mirror from separating from the second slanted plate.

The fourth means includes a third slanted plate slanted towards the first slanted plate at an angle of 45 degrees, a second total reflection mirror having a third size identical to the third slanted plate and being attached to an upper surface of the third slanted plate, and third protectors attached to both sides of the third slanted plate for preventing second total reflection mirror from separating from the third slanted plate.

When the cartridge enclosing a CD has been loaded into the disc player, the laser beam emitted from the holographic element is transferred to the half mirror through the first total reflection mirror. Then, a half of the laser beam is directed into the first object lens by the half mirror and the remaining half of the laser beam is directed into the second object lens by the second total reflection mirror. The laser beam directed into the second object lens is not converged onto the recording surface of a disc, but dissipated thereon due to a difference of a focusing length between the first and second object lenses.

The laser beam directed into the first object lens is converged onto the recording surface of the disc through the first object lens and is reflected into the photo detector in the holographic element. The photo detector detects tracking and focusing errors based on the reflected beam and sends tracking and focusing error signals to a microcomputer.

Then, the microcomputer sends a current supply signal to the current source so that the current is applied to the tracking coils and focusing coils. When the current is applied to the tracking coils and focusing coils, the tracking coils and focusing coils move in tracking and focusing directions thereby correcting, thereby correcting the tracking and focusing errors.

When the cartridge enclosing a DVD has been loaded into the disc player, a half of the laser beam emitted from the holographic element is directed into the first object lens by the half mirror and the remaining half of the laser beam is directed into the second object lens by the second total reflection mirror. The laser beam directed into the first object lens is not converged onto the recording surface of a disc, but dissipated thereon due to a difference of a focusing length between the first and second object lenses.

The laser beam directed into the second object lens is converged onto the recording surface of the disc and is reflected therefrom. At this time, a half of the reflected beam is inputted into the photo detector by the half mirror, and the remaining half of the reflected beam is transferred to the bottom portion of the object lens holder by the half mirror and is dissipated therefrom. Then, the photo detector detects tracking and focusing errors and sends tracking and focusing error signals to the microcomputer. Therefore, the microcomputer sends a current supply signal to the current source so that the current is applied to the tracking and focusing coils, thereby moving the tracking and focusing coils.

As described above, the optical pick-up apparatus of the present invention can record and reproduce information onto/from both the CD and the DVD while having a simple construction, so the optical pick-up apparatus of the present invention can be easily manufactured with reduced cost.

BRIEF DESCRIPTION OF THE DRAWINGS

The above object and other advantages of the present invention will become more apparent by describing in detail preferred embodiment thereof with reference to the attached drawings in which.

DESCRIPTION OF THE PREFERRED EMBODIMENTS

Hereinbelow, a preferred embodiment of the present invention will be described in detail with reference to the accompanying drawings.

Figure 1:
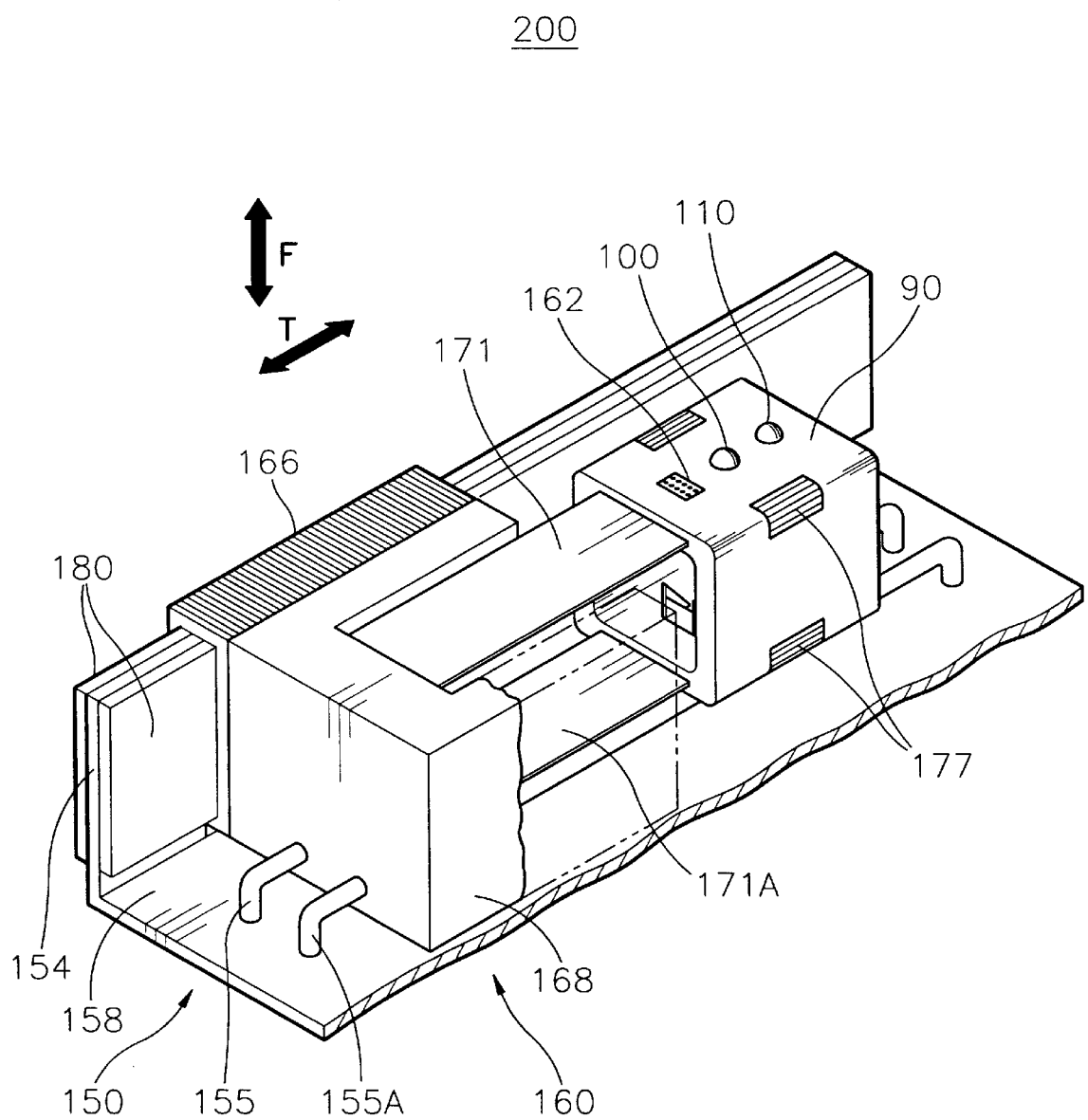
FIG. 1 is a partially cut-away perspective view of an optical pick-up apparatus according to one embodiment of the present invention.
Figure 2:
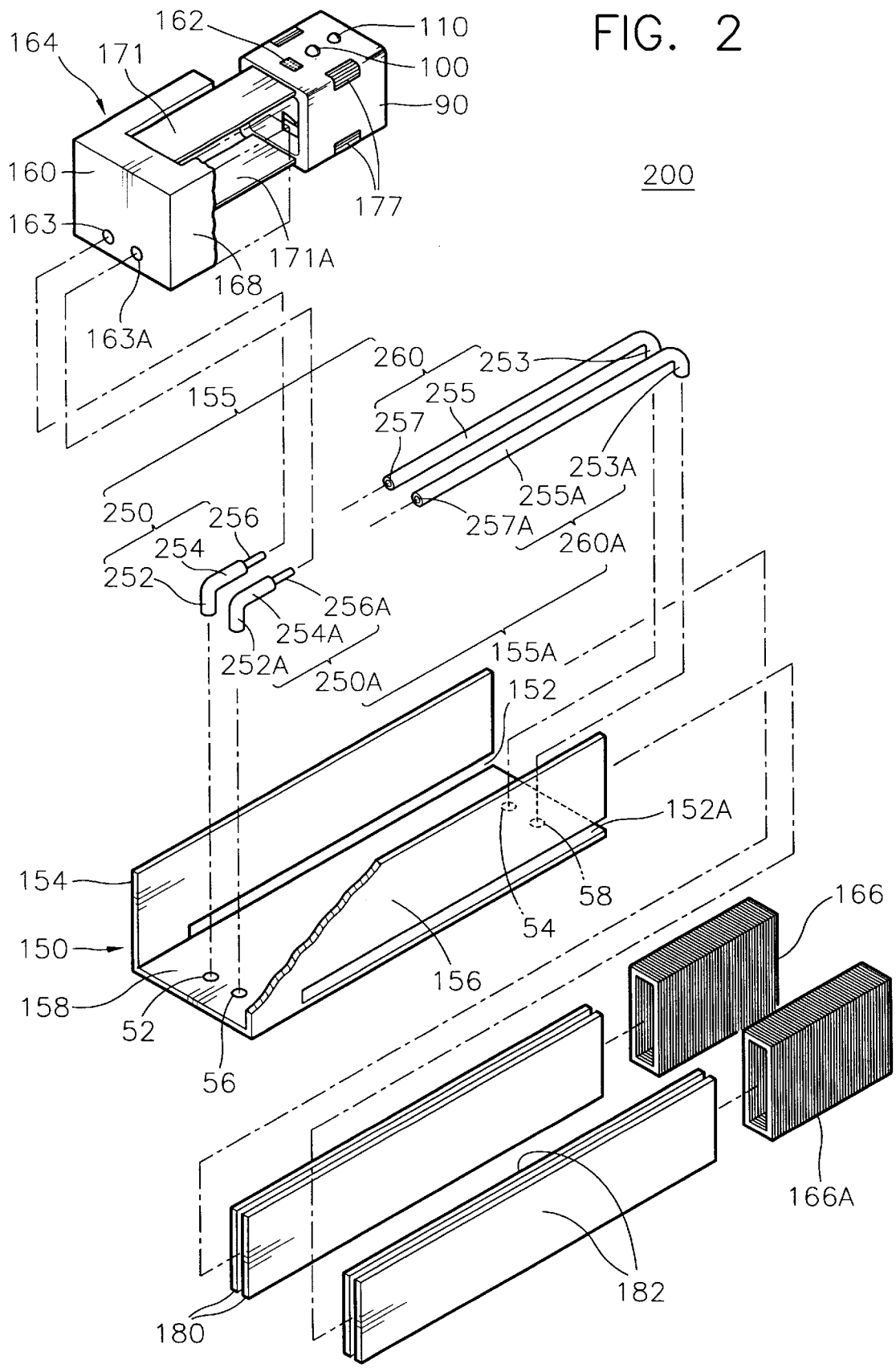
FIG. 2 is an exploded perspective view of an optical pick-up apparatus according to one embodiment of the present invention.

FIG. 1 shows an assembled view of an optical pick-up apparatus 200 according to one embodiment of the present invention, and FIG. 2 shows an exploded perspective view of optical pick-up apparatus 200 according to one embodiment of the present invention.

As shown in FIGS. 1 and 2, optical pick-up apparatus 200 comprises a base plate 150 having a first side wall 154, a second side wall 156 and a bottom wall 158. At the predetermined front and rear positions of bottom wall 158 of base plate 150, there are formed first and second insertion holes 52 and 54 which are disposed in parallel with first side wall 154 of base plate 150 and into which first and second ends of a 155 are press-fitted respectively. Also, third and fourth insertion holes 56 and 58, into which first and second ends of a second guide bar 155A are press-fitted, are formed on bottom wall 158 in parallel with first and second insertion holes 52 and 54. In addition, a first elongated slot 152 having a predetermined length is formed between bottom wall 158 and first side wall 154, and a second elongated slot 152A having a predetermined length is formed between bottom wall 158 and second side wall 156.

A pair of first permanent magnets 180 having lengths similar to the length of first side wall 154 is fixedly coupled to both sides of first side wall 154, and a pair of second permanent magnets 182 having lengths similar to the length of second side wall 156 is fixedly coupled to both sides of second side wall 156. Preferably, first and second permanent magnets 180 and 182 are respectively coupled to first side wall 154 and second side wall 156 by a binding means such as ultraviolet bond.

In addition, a first tracking coil 166 is slidably wound around the pair of first permanent magnets 180, and a second tracking coil 166A is slidably wound around the pair of second permanent magnets 182. First and second tracking coils 166 and 166A are connected to an electric current source (not shown) controlled by a microcomputer through a first flexible printed circuit board. When the electric current is applied thereto, first and second tracking coils 166 and 166A move along first and second elongated slots 152 and 152A in the radial direction of a disc (70 or 72, refer to FIGS. 4 and 5), that is a tracking direction T, due to an electromagnetic-interaction generated between first and second permanent magnets 180 and 182 and first and second tracking coils 166 and 166A.

First and second guide bars 155 and 155A are assembled with a movable member 160 in such a manner that movable member 160 can slide along first and second guide bars 155 and 155A. First and second sides 164 and 168 of movable member 160 are respectively and fixedly coupled to first and second permanent magnets 180 and 182 by a binding means such as ultraviolet bond. Accordingly, while first and second permanent magnets 180 and 182 are moving in tracking direction T, movable member 160 also slides in tracking direction T along first and second guide bars 155 and 155A. At a lower portion of movable member 160, there are formed first and second engagement holes 163 and 163A which are engaged with first and second guide bars 155 and 155A, respectively.

As shown in FIG. 2 in detail, first guide bar 155 includes a first guide member 250 having a first vertical portion 252 and a first horizontal portion 254, and includes a second guide member 260 having a second vertical portion 253 and a second horizontal portion 255. Second horizontal portion 255 has a length longer than the length of first horizontal portion 254 and is formed at a center of a free end thereof with a first perforation hole 257. First horizontal portion 254 is provided at a center of a free end thereof with a first protuberance 256 which is press-fitted into first perforation hole 257. Similar to first guide bar 155, second guide bar 155A includes a third guide member 250A having a third vertical portion 252A and a third horizontal portion 254A, and includes a fourth guide member 260A having a fourth vertical portion 253A and a fourth horizontal portion 255A. Fourth horizontal portion 255A has a length longer than the length of third horizontal portion 254A and is formed at a center of a free end thereof with a second perforation hole 257A. Third horizontal portion 254A is provided at a center of a free end thereof with a second protuberance pin 256A which is press-fitted into second perforation hole 257A.

In the assembling process, second and fourth horizontal portions 255 and 255A are inserted into first and second engagement holes 163 and 163A of movable member 160, and then first and second protuberance pins 256 and 256A are press-fitted into first and second perforation holes 257 and 257A. After that, first to fourth vertical portions 252, 253, 252A and 253A are press-fitted into first to fourth insertion holes 52, 54, 56 and 58, respectively.

Optical pick-up apparatus 200 further comprises upper and lower leaf springs 171 and 171A. First ends of upper and lower leaf springs 171 and 171A are respectively fixed to upper and lower portions of an object lens holder 90. Second ends of upper and lower leaf springs 171 and 171A are fixed to upper and lower portions of movable member 160 in such a manner that object lens holder 90 can be suspended above first and second guide bars 155 and 155A. According to a preferred embodiment of the present invention, upper and lower leaf springs 171 and 171A are integrally formed with object lens holder 90. In addition, a holographic element 162 which radiates a laser beam is provided at a predetermined position on object lens holder 90. Holographic element 162 has a photo detector (not shown) therein. The photo detector receives a laser beam reflected from disc 70 or 72 and detects tracking and focusing errors. Holographic element 162 is connected to the electric current source through a PCB pattern so as to receive a electric current.

Mounted on object lens holder 90 are first and second object lenses 100 and 110 for converging the laser onto the recording surface of disc 70 or 72. First and second object lenses 100 and 110 are positioned at a right side of holographic element 162 and spaced at a predetermined distance apart from each other. In this embodiment, first object lens 100 is used for the CD, and second object lens 110 is used for the DVD. Accordingly, first object lens 100 has a curvature radius larger than that of second object lens 110.

When the cartridge enclosing the CD has been loaded into the disc player, since second object lens 110 has a focusing length shorter than a focusing length of first object lens 100, the laser beam directed into the recording surface of the CD through second object lens 110 is not converged onto the recording surface of the CD but dissipated thereon, so the reflected laser beam is not generated. Accordingly, only the laser beam directed onto the recording surface of the CD through first object lens 100 is reflected from the recording surface of the CD and re-directed into holographic element 162. Then, the photo detector of holographic element 162 detects tracking and focusing errors based on the reflected laser beam. This will be more detailedly described below with reference to FIGS. 4 and 5.

According to another embodiment of the present invention, it is also possible to use first object lens 100 for the CD and to use second object lens 110 for the DVD. In this case, second object lens 110 has a curvature radius larger than that of first object lens 100.

On the other hand, a plurality of focusing coils 177 are provided at upper and lower edges of object lens holder 90. Focusing coils 177 are connected to the electric current source controlled by the microcomputer through a second flexible printed circuit board. When the electric current is applied to focusing coils 177, an electromagnetic-interaction is generated between focusing coils 177 and first and second permanent magnets 180 and 182, so object lens holder 90 is moved in a focusing direction F.

Figure 3:
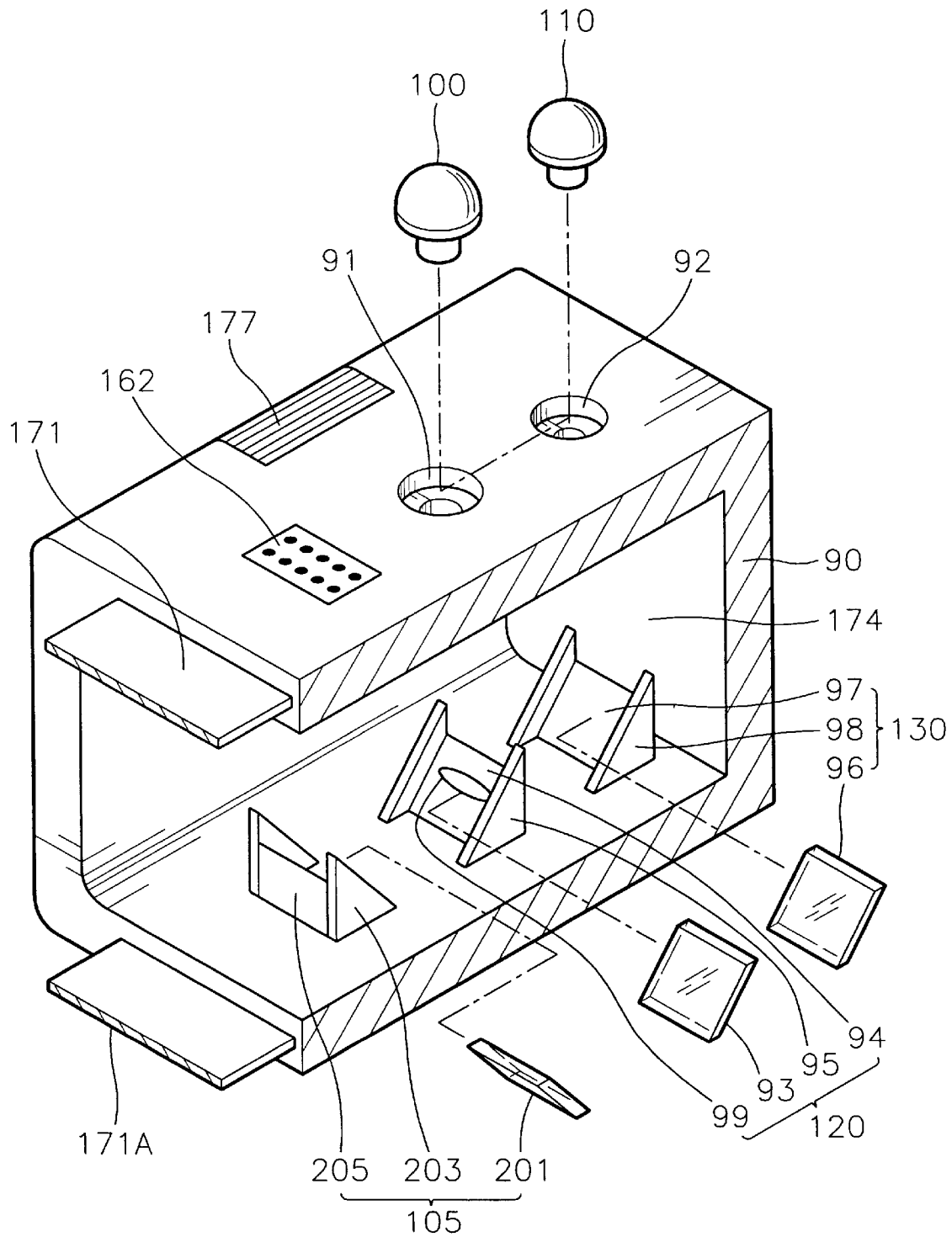
FIG. 3 is a partially-sectioned exploded view illustrating the structure of an object lens holder shown in FIG. 2.

Referring to FIG. 3, first and second object lenses 100 and 110 are respectively mounted on first and second object lens seats 91 and 92 formed on the upper surface of object lens holder 90. Object lens holder 90 has a recess 174 therein. At a first predetermined position on the bottom wall of recess 174 corresponding to the position of holographic element 162, there is fixedly installed a first total reflection section 105 which fully reflects the laser beam emitted from holographic element 162 at an angle of 90 degrees. At a second predetermined position on the bottom wall of recess 174 corresponding to the position of first object lens 100, there is installed a half mirror section 120 which receives the laser beam reflected by first total reflection section 105 and then directs a half of the laser beam toward first object lens 100 and transmits the remaining half of the laser beam therethrough. Half mirror section 120 is faced to first total reflection section 105. In addition, at a third predetermined position on the bottom wall of recess 174 corresponding to the position of second object lens 110, there is installed a total reflection section 130 which directs the laser beam passed through half mirror section 120 towards second object lens 110.

First total reflection section 105 includes a first slanted plate 205 which is slanted at an angle of 45 degrees with respect to holographic element 162, a first total reflection mirror 201 which has a size identical to first slanted plate 205 and is attached to the upper surface of first slanted plate 205, and first protectors 203 attached to both sides of first slanted plate 205 so as to prevent first total reflection mirror 201 from separating from first slanted plate 205.

Half mirror section 120 includes a second slanted plate 94 which is slanted towards first total reflection section 105 at an angle of 45 degrees and is formed at a center thereof with a beam perforating hole 99, a half mirror 93 which has a size identical to second slanted plate 94 and is attached to the upper surface of second slanted plate 94, and second protectors 95 attached to both sides of second slanted plate 94 so as to prevent half mirror 93 from separating from second slanted plate 94. In addition, second total reflection section 130 includes a third slanted plate 97 which is slanted towards first total reflection section 105 at an angle of 45 degrees, a second total reflection mirror 96 which has a size identical to third slanted plate 97 and is attached to the upper surface of third slanted plate 97, and third protectors 98 attached to both sides of third slanted plate 97 so as to prevent second total reflection mirror 96 from separating from third slanted plate 97.

Figure 4:
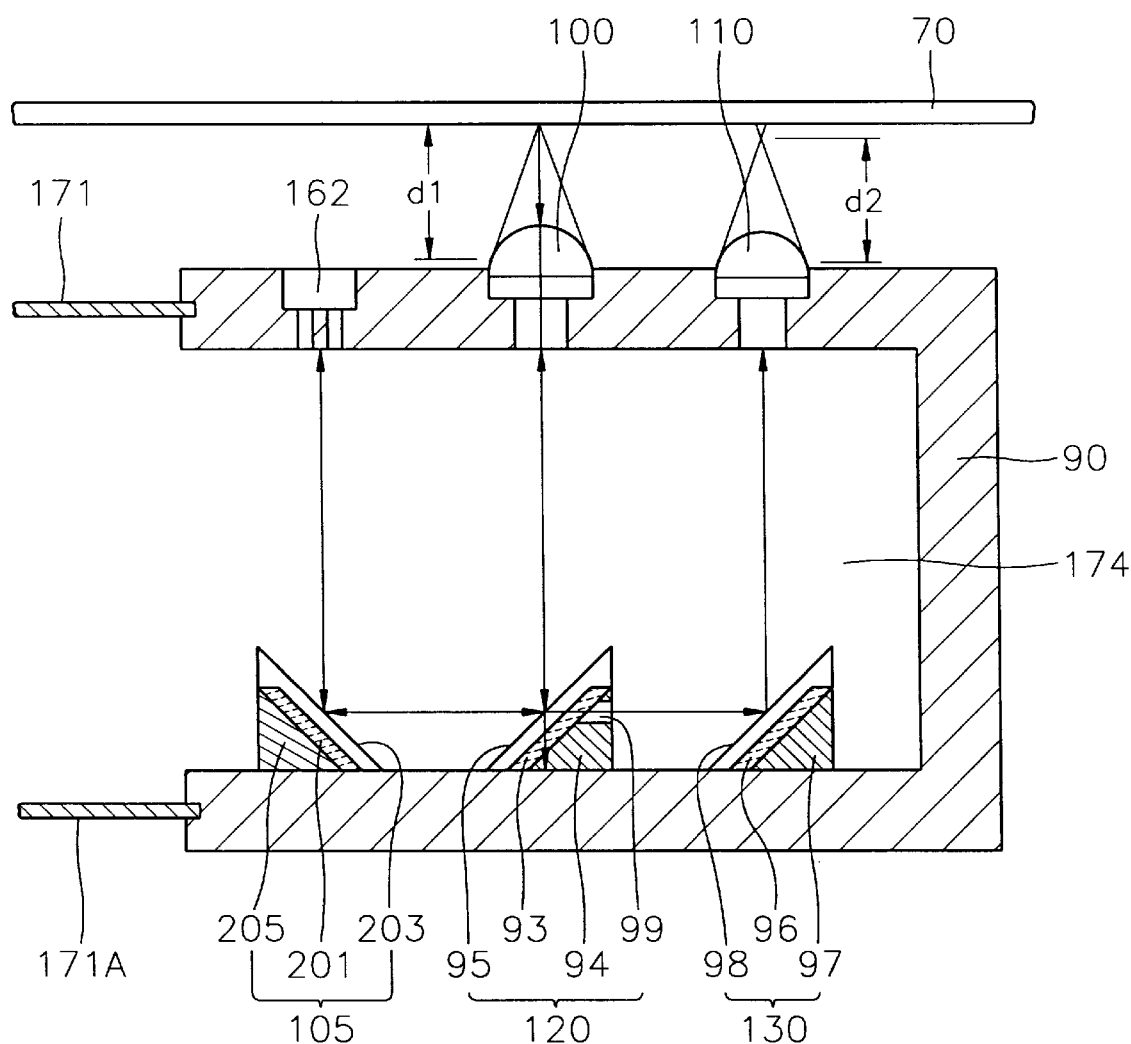
FIG. 4 is a sectional view showing a light path in an optical pick-up apparatus of the present invention when a CD is loaded in a cartridge of a disc player.
Figure 5:
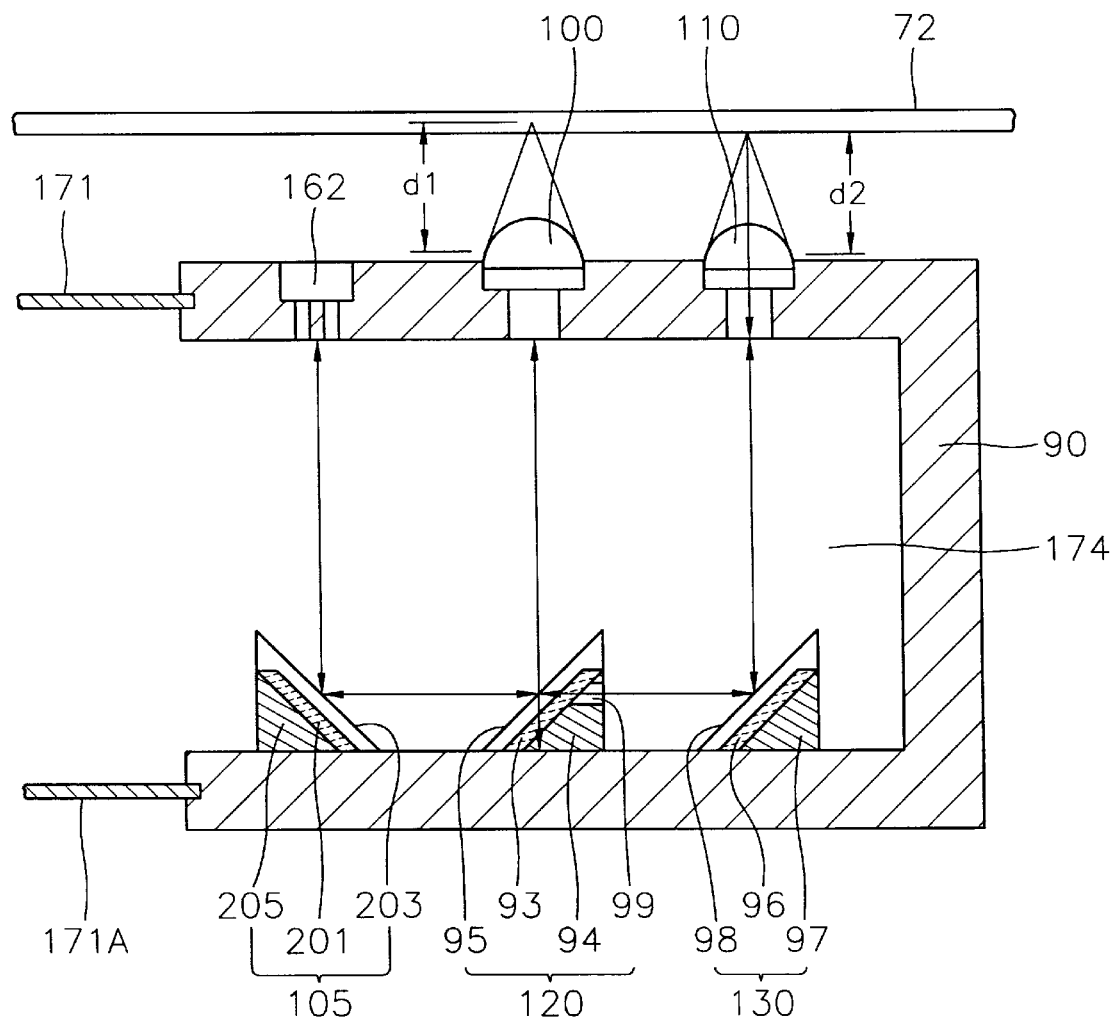
FIG. 5 is a sectional view showing a light path in an optical pick-up apparatus of the present invention when a DVD is loaded in a cartridge of a disc player.
Figure 6:
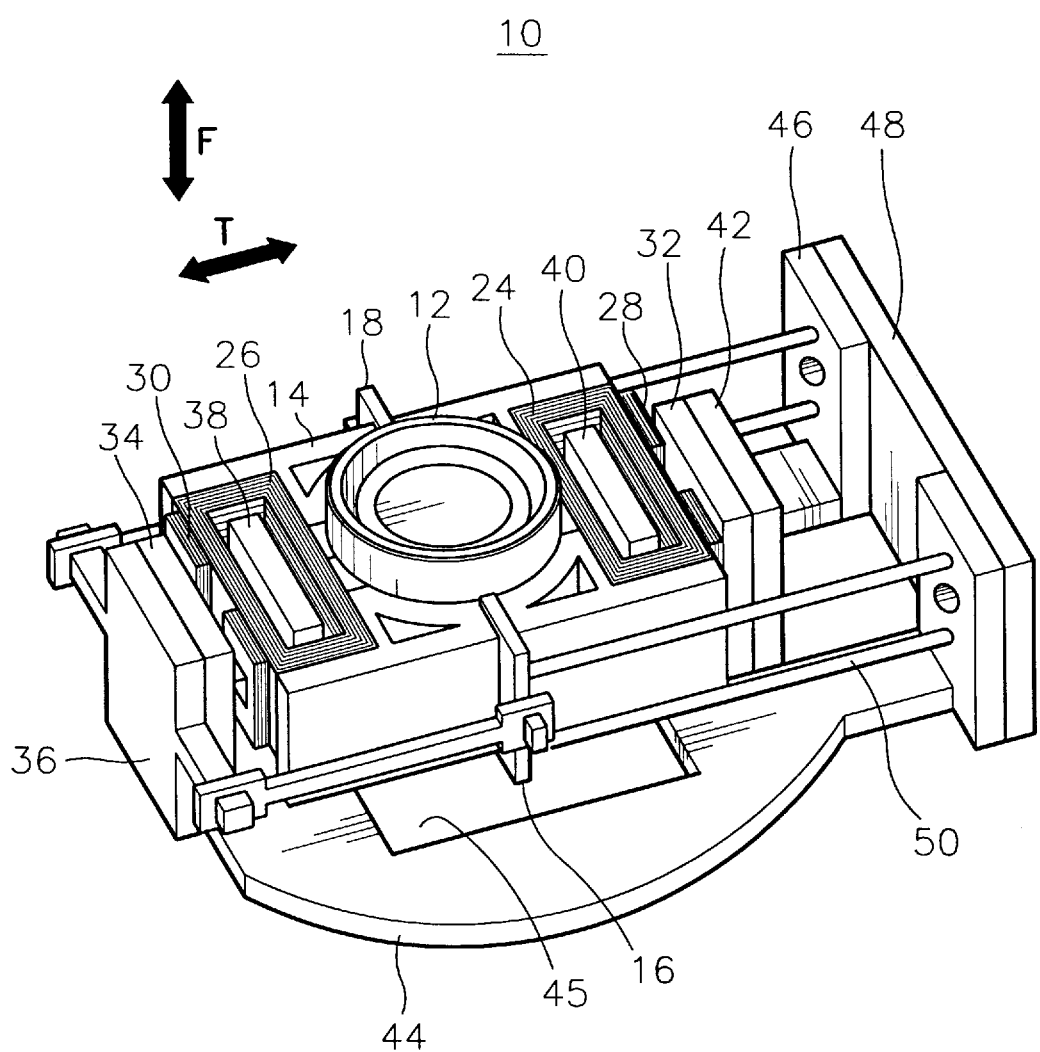
FIG. 6 is a perspective view of a conventional optical pick-up apparatus.

FIGS. 4 and 5 show a laser beam path in optical pick-up apparatus 200 of the present invention. Disc 70 shown in FIG. 4 is a compact disc, and disc 72 shown in FIG. 5 is a digital versatile disc.

Firstly, when the cartridge enclosing CD 70 has been loaded into the disc player, the laser beam emitted from holographic element 162 is reflected at an angle of 90 degrees by first total reflection section 105 and is transferred to half mirror section 120 disposed in recess 174 of object lens holder 90. Then, a half of the laser beam is directed into first object lens 100 by half mirror 93 and the remaining half of the laser beam passes through half mirror section 120 through beam perforating hole 99 and is transferred to second total reflection section 130. The laser beam transferred to second total reflection section 130 is directed into second object lens 110 by second total reflection mirror 96.

Next, the laser beam directed into first object lens 100 is converged onto the recording surface of disc 70 through first object lens 100 and is reflected from the recording surface of disc 70. The reflected beam is inputted into the photo detector in holographic element 162 through first object lens 100, half mirror section 120, and first total reflection section 105. The photo detector detects tracking and focusing errors based on the reflected beam and sends tracking and focusing error signals to the microcomputer. Upon receiving the tracking and focusing error signals, the microcomputer sends a current supply signal to the current source so that the current is applied to first and second tracking coils 166 and 166A and focusing coils 177 from the current source.

When the current is applied to first and second tracking coils 166 and 166A, Lorentz force is generated between first and second tracking coils 166 and 166A and first and second permanent magnets 180 and 182, so first and second tracking coils 166 and 166A move in tracking direction T. At this time, since both sides of movable member 160 are respectively coupled to first and second tracking coils 166 and 166A, movable member 160 also moves in tracking direction T along first and second guide bars 155 and 155A. Accordingly, object lens,holder 90, which is connected to movable member 160 by upper and lower leaf springs 171 and 171A, moves in tracking direction T so as to arrange first object lens 100 in an accurate track position, thereby correcting the tracking error caused by a radial deviation of disc 70.

At the same time, when the current is applied to focusing coils 177, Lorentz force is generated between focusing coils 177 and first and second permanent magnets 180 and 182, so object lens holder 90 moves in focusing direction F while overcoming the bias force of upper and lower leaf springs 171 and 171A. Accordingly, first object lens 100 mounted on the upper surface of object lens holder 90 moves in focusing direction F, thereby correcting the focusing error caused by a vertical motion of the disc.

The focusing control and tracking control is continuously carried out while optical pick-up is being operated so as to precisely record/reproduce information onto/from disc 70.

On the other hand, since the curvature radius of second object lens 110 is smaller than the curvature radius of first object lens 100, a focusing length $d_2$ of second object lens 110 is shorter than a focusing length $d_1$ of first object lens 100. Therefore, the laser beam directed onto the recording surface of disc 70 through second object lens 110 is not converged onto the recording surface of disc 70 but dissipated thereon, so the reflected laser beam is not generated. Accordingly, the laser beam directed into second object lens 110 through total reflection section 130 does not exert an influence upon the controlling of the focusing and tracking errors.

Next, when the cartridge enclosing DVD 72 has been loaded into the disc player as shown in FIG. 5, the laser beam emitted from holographic element 162 is reflected at an angle of 90 degrees by first total reflection section 105 and is transferred to half mirror section 120 disposed in recess 174 of object lens holder 90. Then, a half of the laser beam is directed into first object lens 100 by half mirror 93 and the remaining half of the laser beam passes through half mirror section 120 through beam perforating hole 99 and is transferred to second total reflection section 130. The laser beam transferred to second total reflection section 130 is directed into second object lens 110 by second total reflection mirror 96.

Next, the laser beam directed into second object lens 110 is converged onto the recording surface of disc 72 through second object lens 110 and is reflected from the recording surface of disc 72 into second total reflection section 130 through second object lens 110. Then, the reflected beam is inputted into the photo detector in holographic element 162 through half mirror section 120 and first total reflection section 105. At this time, a half of the reflected beam is inputted into the photo detector by half mirror section 120, and the remaining half of the reflected beam is transferred to the bottom portion of object lens holder 90 by half mirror section 120 and is dissipated therefrom.

Upon receiving the reflected beam, the photo detector detects tracking and focusing errors based on the reflected beam and sends tracking and focusing error signals to the microcomputer. Therefore, the microcomputer sends a current supply signal to the current source so that the current is applied to first and second tracking coils 166 and 166A and focusing coils 177 from the current source.

When the current is applied to first and second tracking coils 166 and 166A, Lorentz force is generated between first and second tracking coils 166 and 166A and first and second permanent magnets 180 and 182, so first and second tracking coils 166 and 166A move in tracking direction T. At this time, since both sides of movable member 160 are respectively coupled to first and second tracking coils 166 and 166A, movable member 160 also moves in tracking direction T along first and second guide bars 155 and 155A. Accordingly, object lens holder 90, which is connected to movable member 160 by upper and lower leaf springs 171 and 171A, moves in tracking direction T so as to arrange first object lens 100 in an accurate track position, thereby correcting the tracking error caused by the radial deviation of disc 72.

At the same time, when the current is applied to focusing coils 177, Lorentz force is generated between focusing coils 177 and first and second permanent magnets 180 and 182, so object lens holder 90 moves in focusing direction F while overcoming the bias force of upper and lower leaf springs 171 and 171A. Accordingly, first object lens 100 mounted on the upper surface of object lens holder 90 moves in focusing direction F, thereby correcting the focusing error caused by the vertical motion of the disc.

As mentioned above, since the curvature radius of first object lens 100 is larger than the curvature radius of second object lens 110, a focusing length $d_1$ of first object lens 100 is longer than a focusing length $d_2$ of second object lens 110. Therefore, the laser beam directed onto the recording surface of disc 72 through first object lens 100 is not converged onto the recording surface of disc 72 but dissipated thereon, so the reflected laser beam is not generated. Accordingly, the laser beam directed into first object lens 100 through half mirror section 120 does not exert an influence upon the controlling of the focusing and tracking errors.

As described above, the optical pick-up apparatus of the present invention can record and reproduce information onto/from both the CD and the DVD while having a simple construction, so the optical pick-up apparatus of the present invention can be easily manufactured with reduced cost.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. An optical pick-up apparatus comprising:
   a base plate having a first side wall, a second side wall and a first bottom wall;
   first and second guide bars fixed to the first bottom wall of the base plate;
   a pair of first permanent magnets fixedly coupled to both sides of the first side wall of the base plate;
   a pair of second permanent magnets fixedly coupled to both sides of the second side wall of the base plate;
   a first tracking coil slidably wound around the pair of first permanent magnets, the first tracking coil and the pair of first permanent magnets generating a first electromagnetic interaction therebetween;
   a second tracking coil slidably wound around the pair of second permanent magnets, the second tracking coil and the pair of second permanent magnets generating a second electromagnetic interaction therebetween;

an objective lens holder formed with focusing coils at upper and lower edges thereof, the objective lens holder having a holographic element for radiating a laser beam at a first upper portion thereof, the focusing coils and the pairs of first and second permanent magnets generating a third electromagnetic interaction therebetween;

first and second objective lenses for converging the laser beam onto a recording surface of a disc, the first objective lens being disposed at a second upper portion of the objective lens holder, the second objective lens being disposed at a third upper portion of the objective lens holder, the first objective lens having a first radius of curvature, the second objective lens having a second radius of curvature different from the first radius of curvature;

a movable member slidably assembled with the first and second guide bars, the movable member being coupled to both first and second tracking coils;

a first means for coupling the objective lens holder to the movable member, the objective lens holder being moved up and down by the first means;

a second means for fully reflecting the laser beam radiated from the holographic element;

a third means for receiving the laser beam reflected by the first means, the first means directing a half of the reflected laser beam towards the first objective lens and transmitting a remaining half of the laser beam through the third means; and a fourth means for directing the laser beam which passes through the third means towards the second objective lens.

2. The optical pick-up apparatus as claimed in claim 1, wherein the first and second guide bars are disposed in parallel to the first and second side walls of the base plate, the first and second guide bars being spaced by a predetermined distance apart from each other.

3. The optical pick-up apparatus as claimed in claim 1, wherein the pair of first permanent magnets have a length identical to a first length of first side wall, the pair of second permanent magnets have a length identical to a second length of second side wall, the first and second permanent magnets being respectively adhered to the first and second side walls of the base plate by means of an ultraviolet bond.

4. The optical pick-up apparatus as claimed in claim 1, wherein both sides of the movable member are respectively fixedly adhered to the first and second tracking coils by means of an ultraviolet bond.

5. The optical pick-up apparatus as claimed in claim 4, wherein a first elongated slot having a first predetermined length is formed between the first bottom wall and the first side wall of the base plate and a second elongated slot having a second predetermined length is formed between the first bottom wall and the second side wall of the base plate, the first and second tracking coils being moved along the first and second elongated slots.

6. The optical pick-up apparatus as claimed in claim 4, wherein the movable member has first and second engagement holes at a lower portion thereof, the first and second guide bars being respectively engaged with the first and second engagement holes, both sides of the movable member being adhered to the first and second tracking coils by means of an ultraviolet bond.

7. The optical pick-up apparatus as claimed in claim 4, wherein each of the first and second guide bars includes a first guide member having a first vertical portion and a first horizontal portion, and a second guide member having a second vertical portion and a second horizontal portion, the first vertical portion having a first height, the second vertical portion having a second height identical to the first height, the first horizontal portion having a first length, the second horizontal portion having a second length, the second length being longer than the first length, the second horizontal portion being formed with a perforation hole at a first center of a first free end thereof, the first horizontal portion being provided with a protuberance at a second center of a second free end thereof which is press-fitted into the perforation hole.

8. The optical pick-up apparatus as claimed in claim 1, wherein the first means includes first and second leaf springs, the first leaf spring having a first end secured to an upper portion of the objective lens holder and a second end secured to an upper portion of the movable member, the second leaf spring having a third end secured to a lower portion of the objective lens holder and a fourth end secured to a lower portion of the movable member.

9. The optical pick-up apparatus as claimed in claim 8, wherein the first and second leaf springs are integrally formed with the objective lens holder.

10. The optical pick-up apparatus as claimed in claim 8, wherein the first radius curvature of the first objective lens is larger than the second radius of curvature of the second objective lens.

11. The optical pick-up apparatus as claimed in claim 8, wherein the second radius of curvature of the second objective lens is larger than the first radius of curvature of the first objective lens.

12. The optical pick-up apparatus as claimed in claim 8, wherein the objective lens has a recess therein, the second, third, and fourth means being fixedly installed at a second bottom wall of the recess.

13. The optical pick-up apparatus as claimed in claim 12, wherein the second means is disposed at a first predetermined position on the second bottom wall of the recess corresponding to a position of the holographic element, the third means is disposed at a second predetermined position on the second bottom wall of the recess corresponding to a position of the first objective lens, and the fourth means is disposed at a third predetermined position on the second bottom wall of the recess corresponding to a position of the second objective lens.

14. The optical pick-up apparatus as claimed in claim 12, wherein the second means includes a first slanted plate slanted at a first predetermined angle with respect to the holographic element, a first total reflection mirror having a first size identical to a size of the first slanted plate and being attached to an upper surface of the first slanted plate, and first protectors attached to both sides of the first slanted plate for preventing the first total reflection mirror from separating from the first slanted plate.

15. The optical pick-up apparatus as claimed in claim 14, wherein the third means includes a second slanted plate slanted towards the first slanted plate at a second predetermined angle and formed with a beam perforating hole at a center thereof, a half mirror having a second size identical to a size of the second slanted plate and being attached to an upper surface of the second slanted plate, and second protectors attached to both sides of the second slanted plate for preventing the half mirror from separating from the second slanted plate.

16. The optical pick-up apparatus as claimed in claim 15, wherein the fourth means includes a third slanted plate slanted towards the first slanted plate at a third predetermined angle, a second total reflection mirror having a third size identical to the third slanted plate and being attached to an upper surface of the third slanted plate, and third protectors attached to both sides of the third slanted plate for preventing second total reflection mirror from separating from the third slanted plate.

17. The optical pick-up apparatus as claimed in claim 16, wherein the first, second and third slanted plates are slanted at an angle of 45 degrees, the first and second slanted plates facing each other.

\* \* \* \* \*